United States Patent [19]

Sumiya et al.

[11] Patent Number: 4,727,774

[45] Date of Patent: Mar. 1, 1988

[54] CUT-BACK PRESSURE CONTROL DEVICE FOR MULTI-SPEED AUTOMATIC TRANSMISSION

[75] Inventors: Koji Sumiya, Nishio; Yoshikazu Sakaguchi, Anjo; Takuji Taniguchi, Okazaki; Yutaka Taga, Aichi; Yoshio Shindo, Toyota, all of Japan

[73] Assignees: Aisin-Warner Kabushiki Kaisha; Toyota Jidosha Kabushiki Kaishi, both of Aichi, Japan

[21] Appl. No.: 846,046

[22] Filed: Mar. 31, 1986

[30] Foreign Application Priority Data

Jul. 31, 1985 [JP] Japan .................. 60-169196
Jul. 31, 1985 [JP] Japan .................. 60-169194

[51] Int. Cl.$^4$ .............................................. B60K 41/16
[52] U.S. Cl. ........................................ 74/867; 74/868; 74/869
[58] Field of Search .......................... 74/867, 868, 869

[56] References Cited

U.S. PATENT DOCUMENTS

| | | | |
|---|---|---|---|
| 2,923,175 | 2/1960 | Perkins | 74/740 |
| 3,000,230 | 9/1961 | Froslie | 74/869 |
| 3,296,884 | 1/1967 | Leonard | 74/869 X |
| 3,501,979 | 3/1970 | Forster et al. | 74/869 |
| 3,621,737 | 11/1971 | Uozumi | 74/868 |
| 3,656,372 | 4/1972 | Chana | 74/869 |
| 3,724,292 | 4/1973 | Borman | 74/869 |
| 3,752,011 | 8/1973 | Casey et al. | 74/866 |
| 3,752,015 | 8/1973 | Murakami | 74/869 |
| 3,842,693 | 10/1974 | Oberpichler | 74/868 |
| 3,952,614 | 4/1976 | Iijima | 74/868 |
| 3,956,947 | 5/1976 | Leising et al. | 74/866 |
| 4,021,712 | 5/1977 | Ishihara et al. | 74/866 |
| 4,034,628 | 7/1977 | Sakai et al. | 74/869 |
| 4,106,369 | 8/1978 | Taga | 74/868 X |
| 4,155,277 | 3/1979 | Minami et al. | 74/866 |
| 4,253,553 | 3/1981 | Yamada et al. | 74/869 |
| 4,274,303 | 6/1981 | Iwanaga et al. | 74/869 |
| 4,274,307 | 6/1981 | Iwanaga et al. | 74/869 |
| 4,314,488 | 2/1982 | Lauven | 74/869 X |
| 4,324,153 | 4/1982 | Sugimoto et al. | 74/866 |
| 4,324,321 | 4/1982 | Ushijima et al. | 192/13.12 |
| 4,334,441 | 6/1982 | Iwanaga et al. | 74/869 |
| 4,349,088 | 9/1982 | Ito et al. | 192/3.3 |
| 4,360,092 | 11/1982 | Muller et al. | 192/13 R |
| 4,367,528 | 1/1983 | Kawamoto et al. | 74/866 X |
| 4,367,812 | 1/1983 | Kobayashi et al. | 192/3.3 |
| 4,393,467 | 7/1983 | Miki et al. | 74/866 X |
| 4,406,181 | 9/1983 | Kubo et al. | 74/869 |
| 4,411,174 | 10/1983 | Yokoi et al. | 74/866 |
| 4,432,255 | 2/1984 | Borman et al. | 74/868 |
| 4,445,401 | 5/1984 | Ishimura | 74/868 X |
| 4,485,695 | 12/1984 | Kawamoto | 74/868 |
| 4,494,640 | 1/1985 | Honig | 74/868 |
| 4,497,222 | 2/1985 | Nagaoka et al. | 74/869 |
| 4,512,212 | 4/1985 | Ishikawa | 74/733 X |
| 4,527,678 | 7/1985 | Pierce et al. | 74/866 |
| 4,532,829 | 8/1985 | Sugano | 74/869 |
| 4,555,964 | 12/1985 | Sugano | 74/865 |
| 4,563,918 | 1/1986 | Sugano | 74/869 |
| 4,570,511 | 2/1986 | Nishimura et al. | 74/868 |
| 4,573,375 | 3/1986 | Hamada et al. | 74/867 |
| 4,576,062 | 3/1986 | Reppert et al. | 74/740 |
| 4,580,466 | 4/1986 | Iwanaga | 74/869 |
| 4,588,059 | 5/1986 | Miki et al. | 192/3.31 X |
| 4,598,612 | 7/1986 | Ideta | 74/869 X |
| 4,602,529 | 7/1969 | Sugano | 74/869 |
| 4,617,841 | 10/1986 | Sugano | 74/864 X |

FOREIGN PATENT DOCUMENTS

| | | | |
|---|---|---|---|
| 123041 | 9/1980 | Japan | 74/869 |
| 37140 | 3/1981 | Japan . | |
| 188147 | 10/1984 | Japan . | |
| 231059 | 11/1985 | Japan | 74/866 |
| 237256 | 11/1985 | Japan | 74/866 |

Primary Examiner—Dirk Wright
Attorney, Agent, or Firm—Wenderoth, Lind & Ponack

[57] ABSTRACT

A cut-back pressure control device for a multi-speed automatic transmission includes a cut-back valve that has a spool which is controlled by both hydraulic pressure which changes in response to shifting of a sub-transmission unit between high-speed and low-speed modes and a hydraulic pressure which is established by the operation of the main transmission unit at 2nd or higher speeds. The spool is moved to a position where it interrupts the cut-back pressure when the main transmission unit selects the 1st speed while the sub-transmission unit is in the low-speed mode, whereas, when the sub-transmission unit is in the high-speed mode or when the main transmission unit selects the 2nd or a higher speed, the spool is held at a position at which it permits the supply of the cut-back pressure.

5 Claims, 14 Drawing Figures

FIG. 7

| position | | solenoid valve | | | | | clutch | | | brake | | | | OWC | | |
|---|---|---|---|---|---|---|---|---|---|---|---|---|---|---|---|---|
| | | $S_1$ | $S_2$ | $S_3$ | $S_L$ | $S_D$ | $C_0$ | $C_1$ | $C_2$ | $B_0$ | $B_1$ | $B_2$ | $B_3$ | $F_0$ | $F_1$ | $F_2$ |
| P | | × | ○ | × | × | × | ○ | × | × | × | × | × | × | × | × | × |
| R | | × | ○ | × | × | × | ○ | × | ○ | × | × | × | ○ | ○ | × | × |
| N | | × | ○ | × | × | × | ○ | × | × | × | × | × | × | × | × | × |
| D | 1st | × | ○ | × | × | × | ○ | ○ | × | × | × | × | × | ○ | × | ⊗ |
| | 2nd | × | ○ | ○ | ◎ | ※ | × | ○ | × | ○ | × | × | × | × | × | ⊗ |
| | 3rd | ○ | ○ | × | ◎ | ※ | ○ | ○ | × | × | × | ○ | × | ○ | ⊗ | × |
| | 4th | ○ | ○ | ○ | ◎ | × | × | ○ | × | ○ | × | ○ | × | × | ⊗ | × |
| | 5th | ○ | × | × | ◎ | × | ○ | ○ | ○ | × | × | ○ | × | ○ | × | × |
| | 6th | ○ | × | ○ | ◎ | × | × | ○ | ○ | ○ | × | ○ | × | × | × | × |
| | (5th) | × | × | × | × | × | ○ | ○ | ○ | × | × | ○ | × | ○ | × | × |
| S | 1st | × | ○ | × | × | × | ○ | ○ | × | × | × | × | × | ○ | × | ⊗ |
| | 2nd | × | ○ | ○ | ◎ | ※ | × | ○ | × | ○ | × | × | × | × | × | ⊗ |
| | 3rd | ○ | ○ | × | ◎ | ※ | ○ | ○ | × | × | ○ | ○ | × | ○ | ○ | × |
| | 4th | ○ | ○ | ○ | ◎ | × | × | ○ | × | ○ | ○ | ○ | × | × | ○ | × |
| | 5th | ○ | × | × | ◎ | × | ○ | ○ | ○ | × | × | ○ | × | ○ | × | × |
| | 6th | ○ | × | ○ | ◎ | × | × | ○ | ○ | ○ | × | ○ | × | × | × | × |
| | (5th) | × | × | × | × | × | ○ | ○ | ○ | × | × | ○ | × | ○ | × | × |
| L | 1st | × | ○ | × | × | × | ○ | ○ | × | × | × | × | ○ | ○ | × | ○ |
| | 2nd | × | ○ | ○ | ◎ | ※ | × | ○ | × | ○ | × | × | ○ | × | × | ○ |
| | 3rd | ○ | ○ | × | ◎ | ※ | ○ | ○ | × | × | ○ | ○ | × | ○ | ○ | × |
| | 4th | ○ | ○ | ○ | ◎ | × | × | ○ | × | ○ | ○ | ○ | × | × | ○ | × |
| | (1st) | × | × | × | × | × | ○ | ○ | × | × | × | × | ○ | ○ | × | ○ | note:
- ○ : ON / engaged / locked
- × : OFF / released / free
- ◎ : ON L-UP ON / OFF L-UP OFF
- ⊗ : free when coasting
- ※ : actuated when sifting 2→3

2nd

3rd

6th

R

CUT-BACK PRESSURE CONTROL DEVICE FOR MULTI-SPEED AUTOMATIC TRANSMISSION

BACKGROUND OF THE INVENTION

1. Field of the Invention

The present invention relates to an automotive automatic transmission and, more particularly, to a cut-back pressure control device for a multi-speed automatic transmission which is comprised of a main transmission unit and a sub-transmission unit.

2. Description of the Related Art

Generally, an automatic transmission has a torque converter and a planetary speed changing gear mechanism. The planetary speed changing gear mechanism is comprised mainly of an overdrive (O/D) planetary gear unit, a front planetary gear unit and a rear planetary gear unit. The planetary speed changing gear mechanism performs, under the control of two solenoid valves and three shift valves, a speed change over four forward speeds and one reverse speed.

The known automatic transmission of the type explained above has a cut-back valve which is adapted to apply a cut-back pressure to the throttle valve. The hydraulic pressure which is supplied to a 2nd brake hydraulic servomotor $B_2$ at second or a higher speed is delivered also to the cut-back valve, so that the cut-back valve interrupts the cut-back pressure when at first speed or in reverse and delivers the cut-back pressure when second or a higher speed is selected.

Japanese Laid-Open Patent No. 37140/1982 of the present applicant proposes a transmission control device incorporating three solenoid valves and three shift valves, adapted for controlling the operation of a six-speed automatic transmission which consist of a combination of a sub-transmission unit comprised of an overdrive planetary gear unit and a main transmission unit comprised of a front planetary gear unit and a rear planetary gear unit.

In this automatic transmission, six speeds are obtained by suitably combining two speeds provided by the sub-transmission unit, namely, overdrive speed and direct-coupling speed, and three speeds provided by the main transmission unit, namely, 1st, 2nd and 3rd speeds. It is to be pointed out that the six-speed automatic transmission mentioned above encounters the following problem when the pressure to the 2nd brake $B_2$ is used as the signal pressure for operating the cut-back valve as in the known automatic transmission. Namely, when the automatic transmission as a whole is upshifted to the second speed by an upshift of the sub-transmission from the direct-coupling speed to the overdrive speed while the main transmission unit selects the first speed, the cut-back pressure is not supplied so that the throttle pressure and, hence, the line pressure are set at an unnecessarily high level, resulting in an inferior shock tuning during the upshifting and a loss of power due to unnecessary load on the hydraulic pump.

SUMMARY OF THE INVENTION

Accordingly, an object of the invention is to provide a cut-back pressure control device for a multi-speed automatic transmission which permits the supply of the cut-back pressure when the automatic transmission as a whole also selects second speed, thereby obviating the above-described problems of the prior art.

To this end, according to the invention, there is provided a cut-back pressure control device in which the spool of the cut-back valve is controlled by the hydraulic pressure which varies in response to upshifting and downshifting operations of the sub-transmission unit and also by the hydraulic pressure which is obtained when the main transmission unit selects the 2nd or a higher speed, in such a manner that, when the main transmission selects the 1st speed while the sub-transmission unit is in the low-speed mode, the spool is moved to a position where it interrupts the cut-back pressure, whereas, when the sub-transmission unit is in the high-speed mode or when the main transmission selects the 2nd or a higher speed, the spool is held at a position at which it supplies the cut-back pressure.

According to this arrangement, the cut-back pressure is supplied to the throttle valve whenever second or a higher speed is selected in an automatic transmission which provides a plurality of speeds by combination of different speeds given output by the main transmission and sub-transmissions.

Consequently, the unnecessary increase in the throttle pressure and, hence, in the line pressure is avoided and the loss of power due to unnecessary work of the hydraulic pump is reduced. And, an inferior shock turning during the upshifting is prevented.

BRIEF DESCRIPTION OF THE DRAWINGS

FIG. 7 is an illustration of various elements of the automatic transmission in different states of operation.

DESCRIPTION OF THE PREFERRED EMBODIMENTS

A preferred embodiment of the invention will be described hereinunder with reference to the accompanying drawings.

Figure 1:
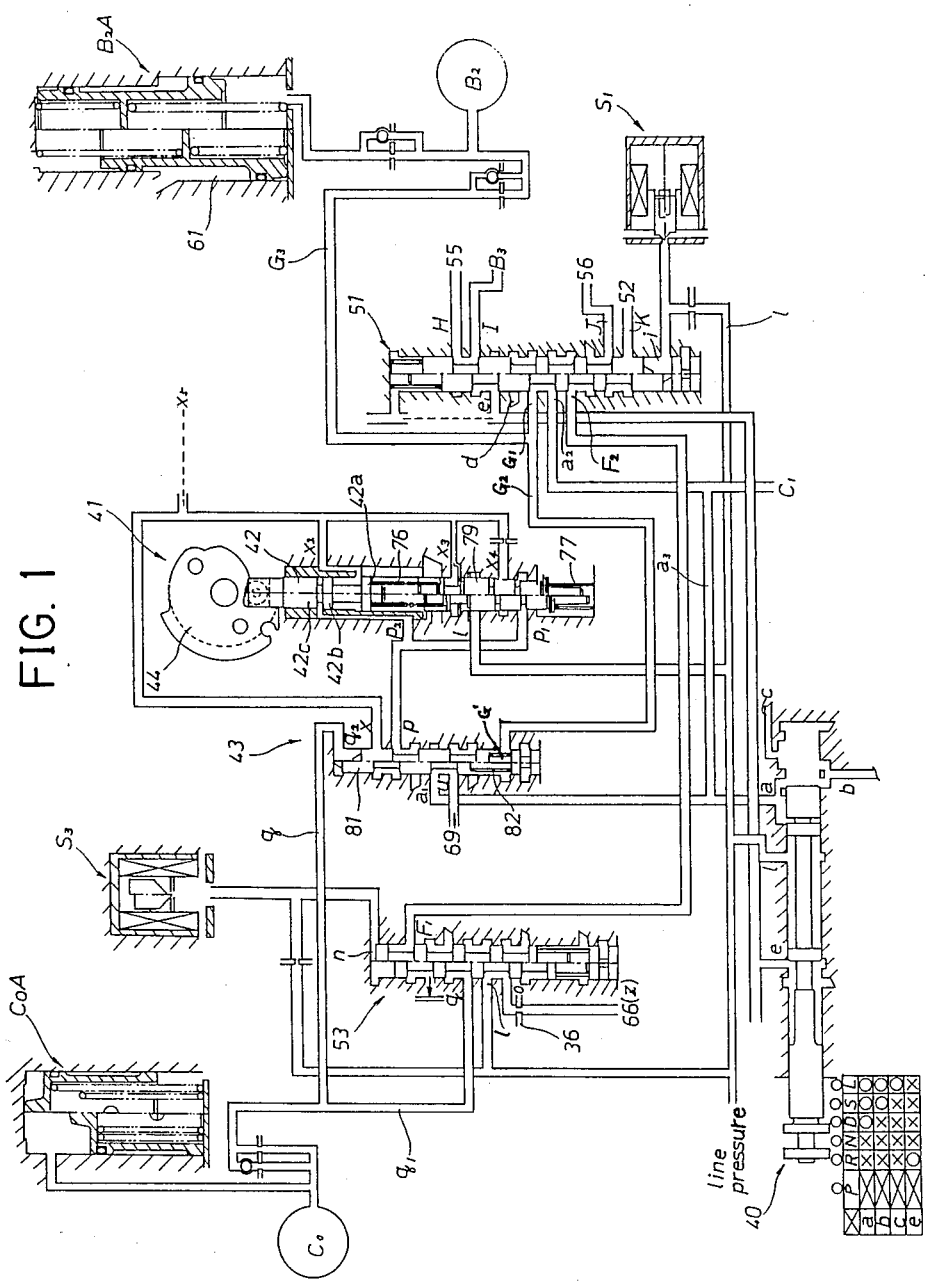
FIG. 1 is an illustration of an embodiment of the cut-back pressure control device in accordance with the present invention.

In the embodiment shown in FIG. 1, a cut-back valve 43 has a spool 81 which is urged upwardly by a spring 82, an upper chamber $q_2$ and a lower chamber G. The upper chamber $q_2$ of the cut-back valve 43 communicates with a servomotor Co of an O/D direct clutch Co (referred to simply as "clutch Co", hereinunder, with similar abbreviations applying to other brakes and clutches), while the lower chamber G communicates through oil passages $G_2$, $G_3$ with the 2nd brake $B_2$ of the main transmission unit which cooperates with a one-way clutch $F_1$ for preventing the rotation of a sun gear 30 in the main transmission unit (see FIG. 10).

Figure 8:
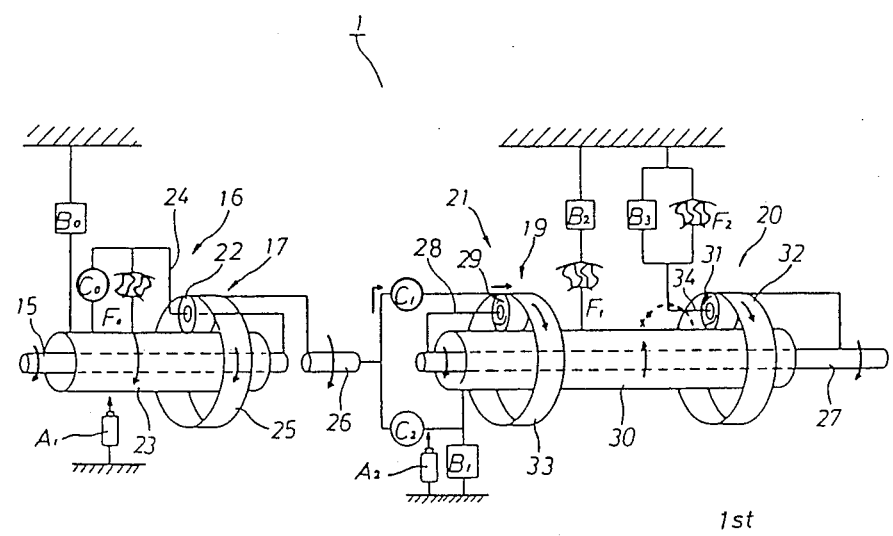
FIGS. 8 thru 14 are schematic illustrations of the automatic transmission in different states of operation.

FIG. 8 shows a state in which the O/D-direct clutch Co is engaged so that the sub-transmission unit 16 selects the direct-coupling speed, while the forward clutch $C_1$ in the main transmission unit 21 is engaged so that the main transmission unit 21 selects the 1st speed gear. Thus, the automatic transmission 1 as a whole selects first speed. In this state, the line pressure produced as a result of the engagement of the clutch Co is applied to the upper chamber $q_2$ of the cut-back valve 43, while no pressure acts in the lower chamber G because the port $a_2$ is disconnected from $G_1$ in the first shift valve 51. Therefore, the cut-back valve 43 assumes the state which is illustrated in the right half part in FIG. 1. Namely, the spool 81 is pressed down against the force of the spring 82 so as to disconnect the port x from the port p. Therefore, the cut-back pressure is not supplied to a throttle valve 41. This operation of the cut-back valve 43 applies also to the case where the manual valve is positioned in the reverse range (see FIG. 14), N range and P range because the O/D-direct clutch Co is supplied with the hydraulic pressure while the brake $B_2$ does not engage in each of these ranges.

Figure 9:
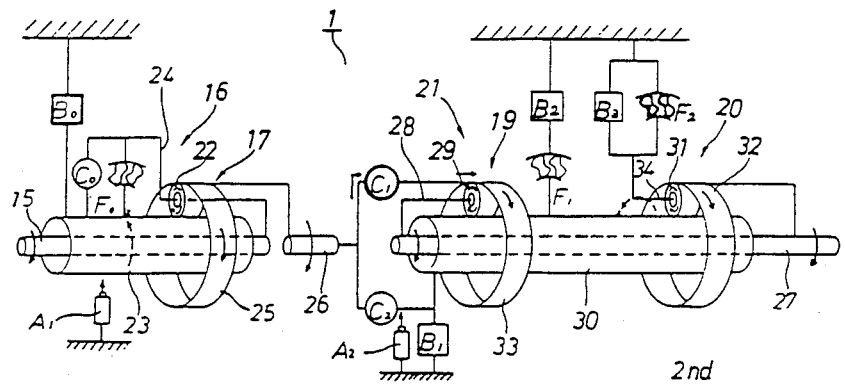

As the automatic transmission as a whole is upshifted from first speed to second speed, the forward clutch $C_1$ is kept in the engaged state so that the main transmission unit 21 still selects the 1st speed gear, whereas, in the sub-transmission unit 16, the brake Bo is engaged while the O/D-direct clutch Co is disengaged, so that the sub-transmission unit 16 is upshifted from the direct-coupling speed to the O/D speed, as shown in FIG. 9. Consequently, the hydraulic oil in the upper chamber $q_2$ of the cut-back valve 43 is drained as a result of the disengagement of the O/D direct clutch Co, so that the spool 81 in this valve 43 is moved upwardly by the force of the spring 82, as shown in left half part in FIG. 1, whereby the port x is brought into communication with the port p. As a result, the cut-back pressure is supplied through the ports $p_1$ and $p_2$, so that the spool 79 is forced back against the force of the spring 76, thereby setting the throttle pressure at a low level.

Figure 10:
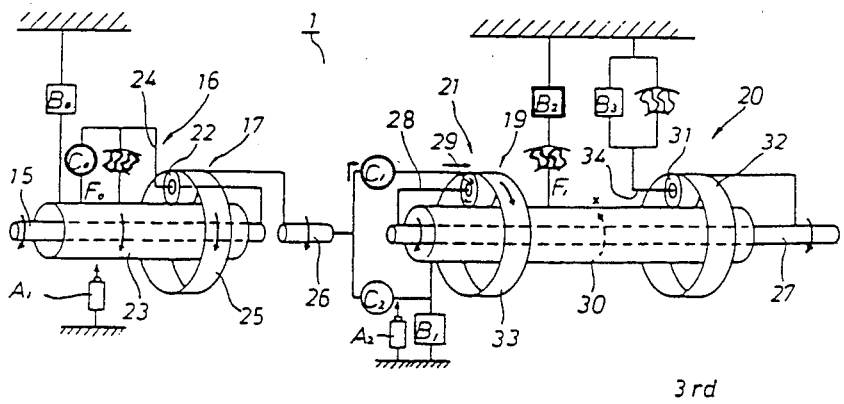

FIG. 10 shows the state of the automatic transmission after upshifting from second speed to third speed. In this case, both the forward clutch $C_1$ and the brake $B_2$ are engaged so that the main transmission unit 21 selects the 2nd speed gear. On the other hand, in the sub-transmission unit 16, the brake Bo is disengaged while the clutch Co is engaged, thus effecting a downshift from the O/D speed to the direct-coupling speed. In this state, the hydraulic pressure is supplied both to the upper chamber $q_2$ and the lower chamber G, so that the spool 81 is held in the upper position (position shown by left half part in FIG. 1), because the upward force which is the sum of the force of the spring 82 and the force produced by the pressure in the lower chamber G exceeds the downward force which is produced by the pressure acting in the upper chamber $q_2$. The communication between the ports x and p, therefore, is also maintained in this state.

When the automatic transmission as a whole is upshifted to fourth, fifth and sixth speeds, the brake $B_2$ in the main transmission unit 21 remains in the engaged state, whereas the direct clutch Co in the sub-transmission unit 16 is engaged and disengaged alternatingly. As a result of the alternating engagement and disengagement of the direct clutch Co in the sub-transmission unit 16, supply and draining of the hydraulic pressure to and from the upper chamber of the cut-back valve 43 are conducted alternatingly. However, since the lower chamber G is continuously supplied with the hydraulic pressure, the cut-back valve 43 is held in the cut-back pressure supply position, as shown at left half part in the Figure, regardless of the change in the pressure in the upper chamber.

Figure 2:
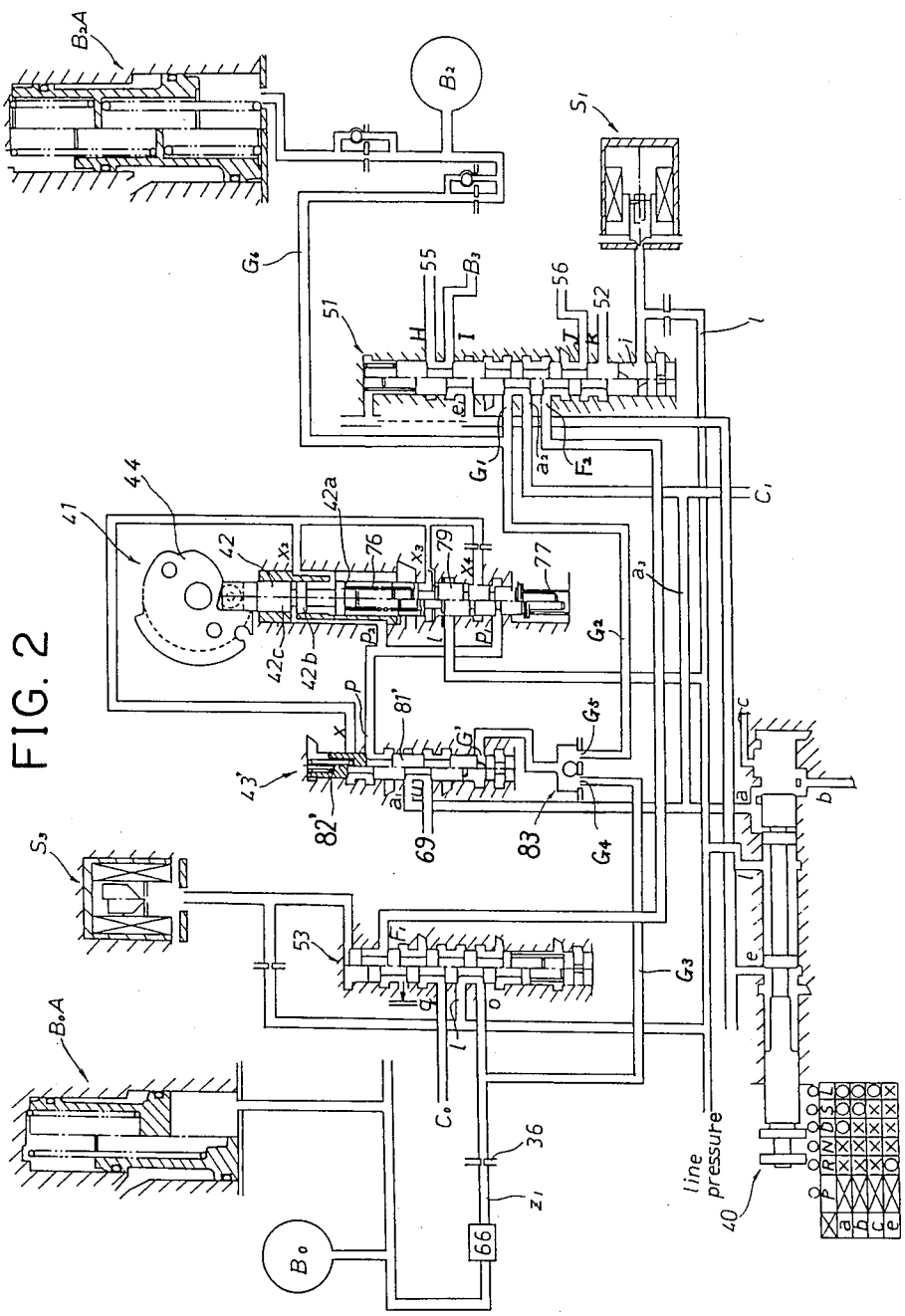
FIG. 2 is an illustration of another embodiment of the cut-back pressure control device of the present invention.

On the other hand, in the embodiment shown in FIG. 2, the cut-back valve 43' has a spool 81' which is urged downwardly by the spring 82', and a lower chamber G'. The lower chamber G' communicates, through a change-over valve 83 which permits the switching of communication, with the brake Bo of the overdrive planetary gear unit and with a 2nd brake $B_2$ which cooperates with the one-way clutch $F_1$ for preventing the sun gear 30 of the main transmission unit from rotating in one direction.

When the automatic transmission 1 as a whole selects first speed, direct clutch Co is engaged and the brake Bo is released so that the sub-transmission unit 16 is in the direct-coupling state, whereas the main transmission unit 21 is in the 1st speed mode because the forward clutch $C_1$ is engaged while the brake $B_2$ is released, as shown in FIG. 8. In this state, no pressure is applied to the lower chamber G' of the cut-back valve 43'. Therefore, the cut-back valve 43' is urged to the position shown at the right half part in FIG. 2 by the spring 82' so that the ports x and p are disconnected from each other, thereby preventing the supply of the cut-back pressure to the throttle valve 41.

When the automatic transmission as a whole is upshifted from first speed to second speed, the lower chamber G of the cut-back valve 43' is supplied with the hydraulic pressure through the change-over valve 83, as a result of the supply of the hydraulic pressure to the O/D brake Bo. Consequently, the spool 81' of the valve 43' is moved upwardly against the force of the spring 82' to the position shown at the left in FIG. 2, thus allowing the ports x and p to communicate with each other.

Then, as the transmission as a whole is shifted from second to third speed, the change-over valve 83 is operated to block the port $G_4$ while opening the port $G_5$, so that the lower chamber G' of the cut-back valve 43' is supplied with the hydraulic pressure from the brake $B_2$ through the oil passage $G_2$. Consequently, the spool 81' is held in the raised position as shown at the left half in the Figure, so as to maintain the ports x and p in communication with each other. Similarly, when the automatic transmission as a whole is upshifted to the fourth, fifth and sixth speeds, the brake $B_2$ in the main transmission unit 21 is held in the engaged state, while the brake Bo in the sub-transmission unit 16 is alternatingly engaged and released. However, the cut-back valve 43 is held in the cut-back pressure supply position (position shown at left half part) because the lower chamber G is continuously supplied with hydraulic pressure from the brake $B_2$ due to the fact that the change-over valve 83 is held in the position described above.

A practical embodiment of the invention will be explained hereinunder with reference to the accompanying drawings.

Figure 3:
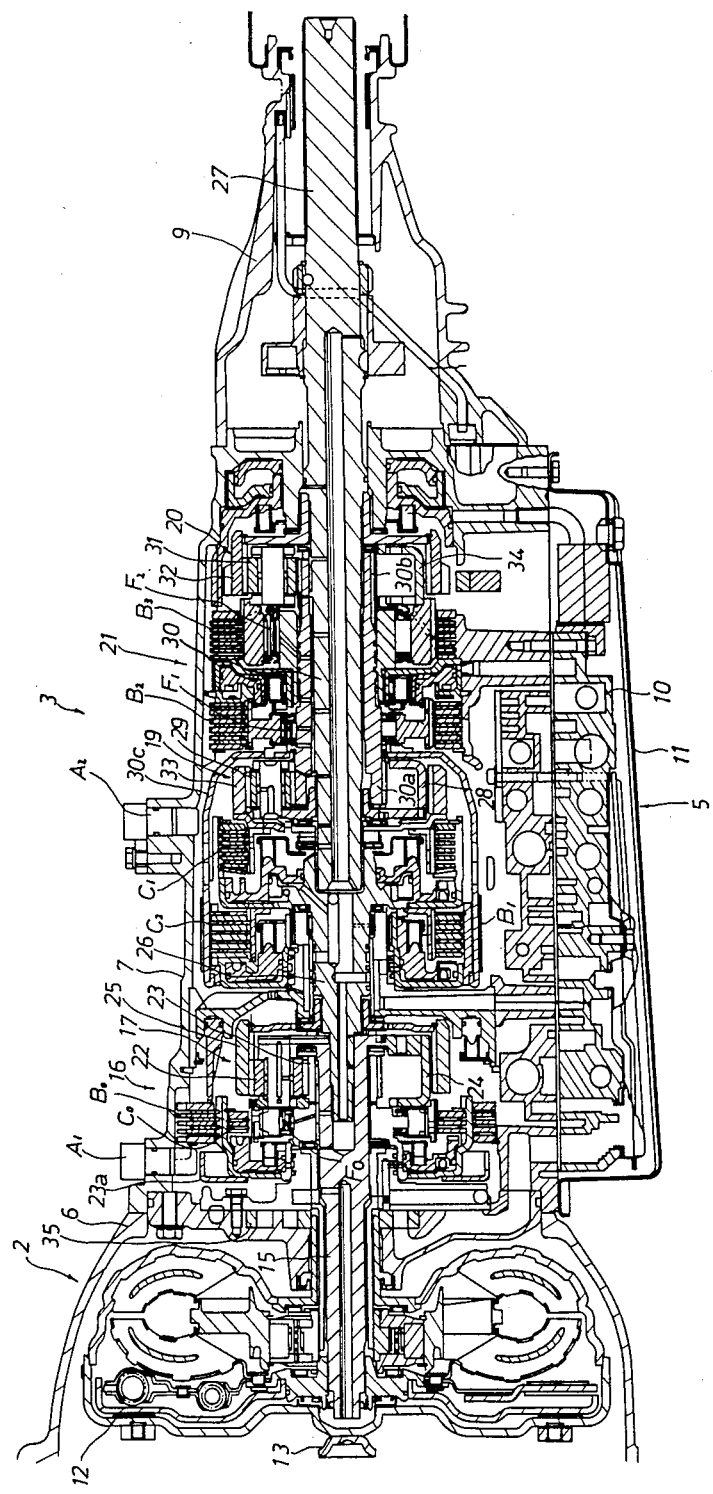
FIG. 3 is a sectional view of the automatic transmission to which the present invention is applied.

As shown in FIG. 3, a multi-speed automatic transmission 1 is equipped with a torque converter 2, planetary speed changing gear mechanism 3 and a hydraulic control mechanism 5 which are housed, respectively, in a converter housing 6, transmission case 7 and an extension housing 9, and a valve body 10 and an oil pan 11. The torque converter 2 has a lock-up clutch 12. The power supplied to the input shaft 13 of the torque converter 2 is transmitted to the input shaft 15 of the speed changing gear mechanism 3 through the intermediary of the oil in the torque converter or, alternatively, directly through the lock-up clutch 12. The speed changing gear mechanism 3 is comprised of a sub-transmission unit 16 consisting of an O/D planetary gear unit 17, and a main transmission unit 21 consisting of a front planetary gear unit 19 and a rear planetary gear unit 20. The O/D planetary gear unit 17 is comprised of a carrier 24 directly connected to the input shaft 15 and supporting planet gears 22, a sun gear 23 on the input shaft 15, and a ring gear 25 directly connected to the input shaft 26 of the main transmission unit 21. An O/D-direct clutch Co and a one-way clutch Fo are connected between the carrier 24 and the sun gear 23, while an O/D brake Bo is connected between the sun gear 23 and the case 7. The front planetary gear unit 19 has a carrier 28 directly connected to the output shaft 27 and supporting planet gears 29, a sun gear 30a on the output shaft 27 and formed as a unit with the sun gear 30b of the rear planetary gear unit 20, and a ring gear 33 which is connected to the input shaft 26 through a forward clutch $C_1$. A direct clutch $C_2$ is connected between the input shaft 26 and the sun gear 30, while a second coast brake $B_1$ is acts between the sun gear 30 and the case 7. A one-way clutch $F_1$ and a brake $B_2$ for locking the outer race of the clutch $F_1$ act between the sun gear 30 and the case 7. Finally, the rear planetary gear unit 20 has a carrier 34 carrying planet gears 31, the sun gear 30b mentioned above, and a ring gear 32 directly connected to the output shaft 27. A 1st & Rev. brake $B_3$ and a one-way clutch $F_2$ are arranged in parallel with each other between the carrier 34 and the case 7. In FIG. 2, reference numeral 35 denotes an oil pump.

A rotation sensor $A_1$ consisting of a photo-electric sensor or a magnetic sensor is mounted on the portion of the case 7 around the O/D planetary gear unit 17. On the other hand, slits or holes are formed at regular intervals in the flange piece 23a connected to the sun gear 23. Thus, the rotation sensor $A_1$ is capable of detecting the rotational speed of the sun gear 23, i.e. the state of shift of the sub-transmission unit 16. A similar rotation sensor $A_2$ is mounted on the portion of the case 7 near the front planetary gear unit 19. On the other hand, notches or holes are formed at regular intervals in a clutch connecting piece 30c which extends from the sun gear 30. Thus, the rotational sensor $A_2$ detects the rotation speed of the sun gear 30, i.e. the state of shift of the main transmission unit 21.

Figure 4:
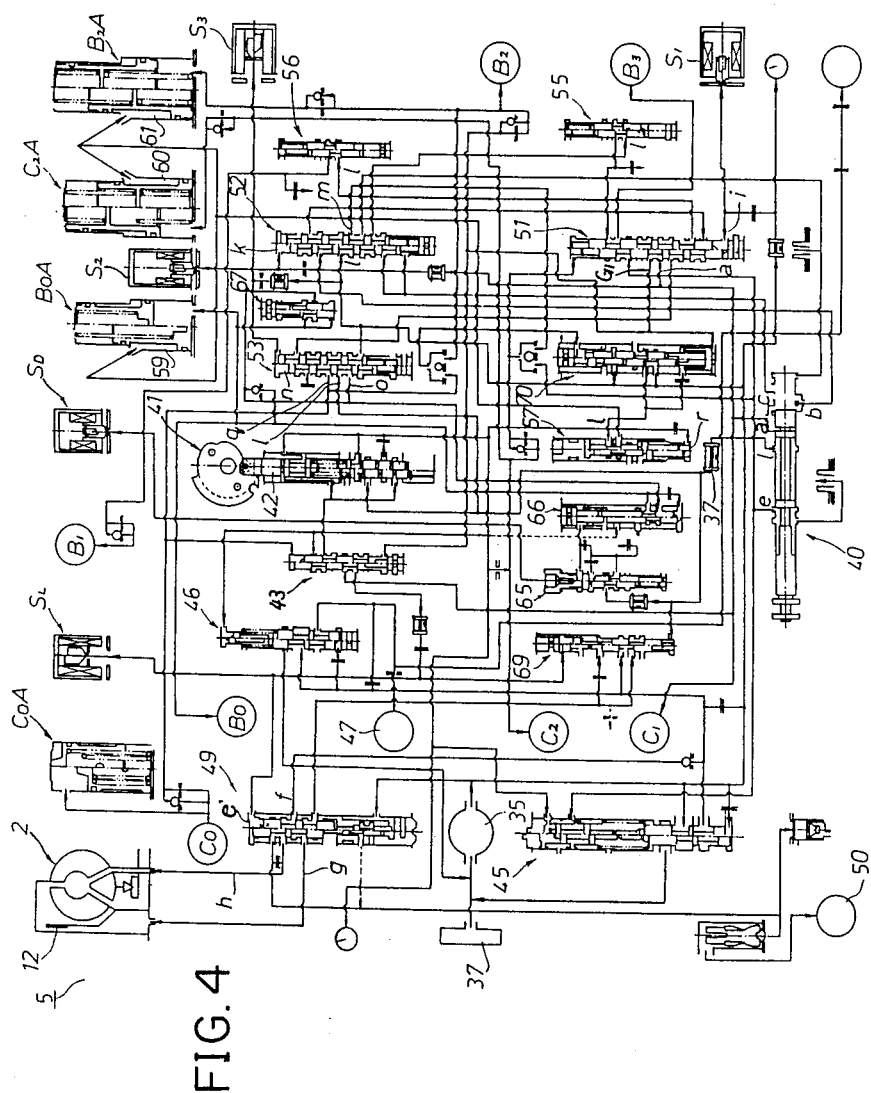
FIG. 4 is an illustration of the hydraulic pressure control mechanism in the automatic transmission.
Figure 5:
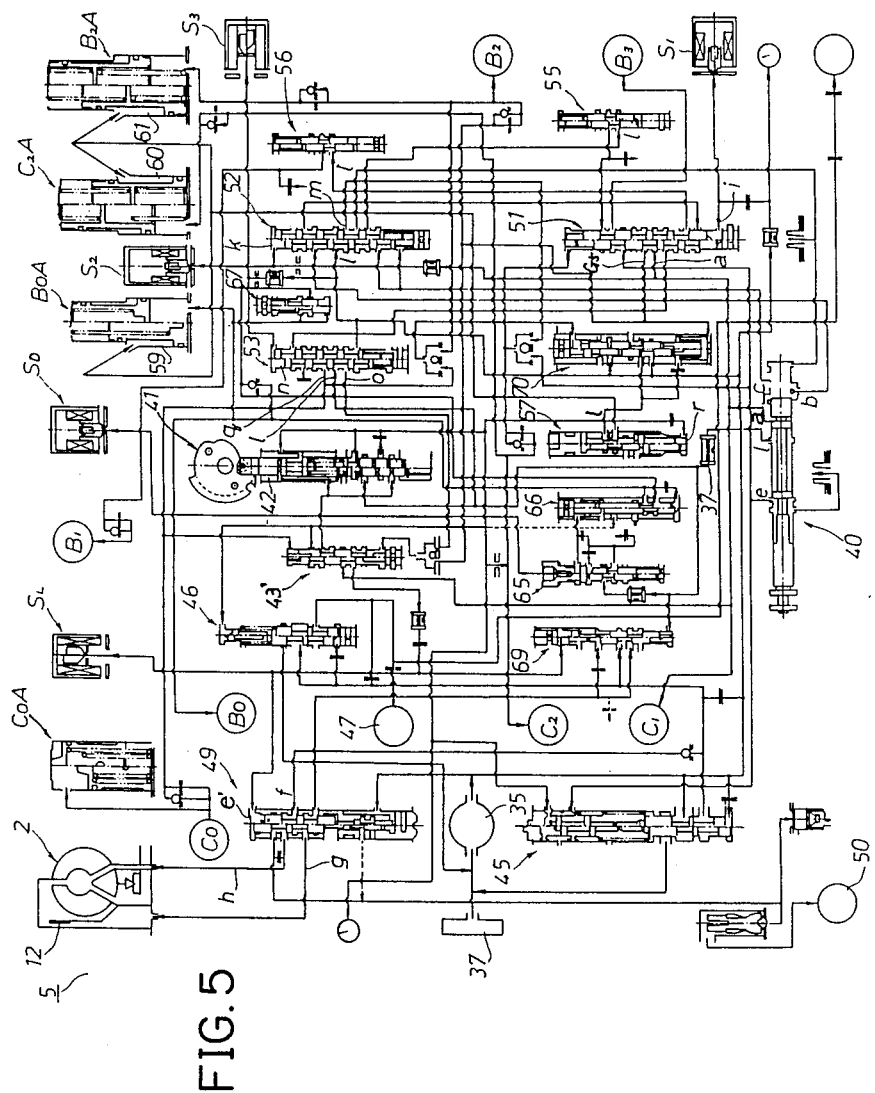
FIG. 5 is an illustration of the another example of the hydraulic pressure control mechanism.

As will be seen from FIGS. 4 and 5, the hydraulic speed changing control mechanism 5 is comprised of various parts such as valves, as well as other constituents such as accummulators, orifices 36 and a filter 37.

A description will be made hereinunder as to the functions of respective valves. The manual valve 40 is operated so as to shift to one of the ranges P, R, N, D, S and L, thereby switching the oil passages a, b, c and e as shown in FIG. 1. The line pressure is fed to the oil passage l. A throttle valve 41 is provided with a downshift plug 42. A cam is rotated in response to the depression of an accelerator pedal, so that a throttle pressure corresponding to the engine power is obtained. The cut-back valve 43 produces cut-back pressure as will be explained below. The cut-back pressure acts on the throttle valve 41. A primary regulator valve 45 is operated by the throttle pressure, so as to produce a line pressure corresponding to the load. Namely, during heavy load operation, the primary regulator valve 45 increases the line pressure so as to ensure the operation of the clutches C and brakes B, whereas during light load operation, the primary regulator valve 45 regulates the line pressure to a comparatively low level. A secondary regulator valve 46 is operated by the pressure derived from the primary regulator valve 45 so as to control the pressure of the converter oil supplied to the converter 2, as well as the pressure of the lubricating oil which is supplied to various parts 47 which need lubrication.

A lock-up relay valve 49 is controlled by a solenoid valve $S_L$ so as to switch the flow of the oil to the lock-up clutch 12 and the oil cooler 50. Namely, the line pressure is supplied to the upper chamber e' as a result of the energization of the solenoid of the solenoid valve $S_L$ so that the converter pressure passage f leading from the primary regulator valve 45 is switched from the lock-up clutch off oil passage g to the on passage h, while allowing the converter pressure to be drained.

A first shift valve 51 is adapted to conduct a switching of the main transmission unit 21 between the 1st speed gear and the 2nd speed gear, i.e., first speed and third speed of the transmission 1 as a whole. The first shift valve 51 is operated by a solenoid valve $S_1$. More specifically, as the solenoid of the solenoid valve $S_1$ is de-energized, the line pressure is introduced into the oil chamber i, so that the line pressure passage a is blocked when the manual valve 40 selects one of the D, S and L ranges. Conversely, when the solenoid of the solenoid valve $S_1$ is energized, the oil passage a is brought into communication with the oil passage $G_1$, so that the line pressure is supplied to the brake $B_2$ and also to a $B_2$ accummulator $B_2A$.

A second shift valve 52 is adapted to conduct the shifting in the main transmission unit 21 between the 2nd speed gear and the 3rd speed gear, i.e. between third speed and the fifth speed of the automatic transmission as a whole, as it is operated under the control of a solenoid valve $S_2$. Namely, when the solenoid of the solenoid valve $S_2$ is de-energized, the line pressure is introduced into the oil chamber k, and the line pressure passage l communicates with the oil passage m, whereby the line pressure is supplied to the direct clutch $C_2$ and also to the $C_2$ accummulator $C_2A$. The line pressure passage, however, is blocked as the solenoid of the solenoid valve $S_2$ is energized.

A third shift valve 53 is adapted to conduct a switching of the state of the sub transmission unit 16, under the control of a solenoid valve $S_3$. Namely, as the solenoid of the solenoid valve $S_3$ is turned on, the line pressure is introduced into the oil chamber n, so that the line pressure passage l is brought into communication with the oil passage o, whereby the line pressure is supplied through a later-mentioned Bo release control valve 65 to the O/D brake Bo and also to the Bo accummulator BoA. However, as the solenoid of the solenoid valve $S_3$ is turned off, the line pressure passage l is brought into communication with the oil passage q, thereby supplying the line pressure to the O/D direct clutch Co and a Co accummulator CoA.

A first coast modulator valve 55 is supplied with the line pressure from the oil passage l through the second shift valve 52 when the manual valve 40 is in the L range, and regulates this pressure into a coast modulator pressure which is supplied through the first shift valve 51 and the second shift valve 52 to a 1st & Rev brake $B_3$. A second coast modulator valve 56 is supplied with the line pressure from the oil passage l through the port b, via the second shift valve 52 and the first shift valve 51, when the manual valve 40 is in the S range, and regulates the pressure to the coast modulator pressure which is supplied to the brake $B_1$.

A first accummulator control valve 57 has an oil chamber r which is supplied with the throttle pressure. In response to this throttle pressure, the first accummulator control valve 57 regulates the line pressure l which is supplied through a later-mentioned second accummulator control valve 70, thereby producing an accummulator control pressure which is supplied to back pressure chambers 59, 60 and 61 of the respective accummulators BoA, $C_2A$ and $B_2A$.

Besides the hydraulic components mentioned hereinabove, the hydraulic speed changing control mechanism 5 has various valves such as an $S_D$ modulator valve 65, Bo release control valve 66, Bo sequence valve 67, lock-up control valve 69 and a second accumulator control valve 70.

Figure 6:
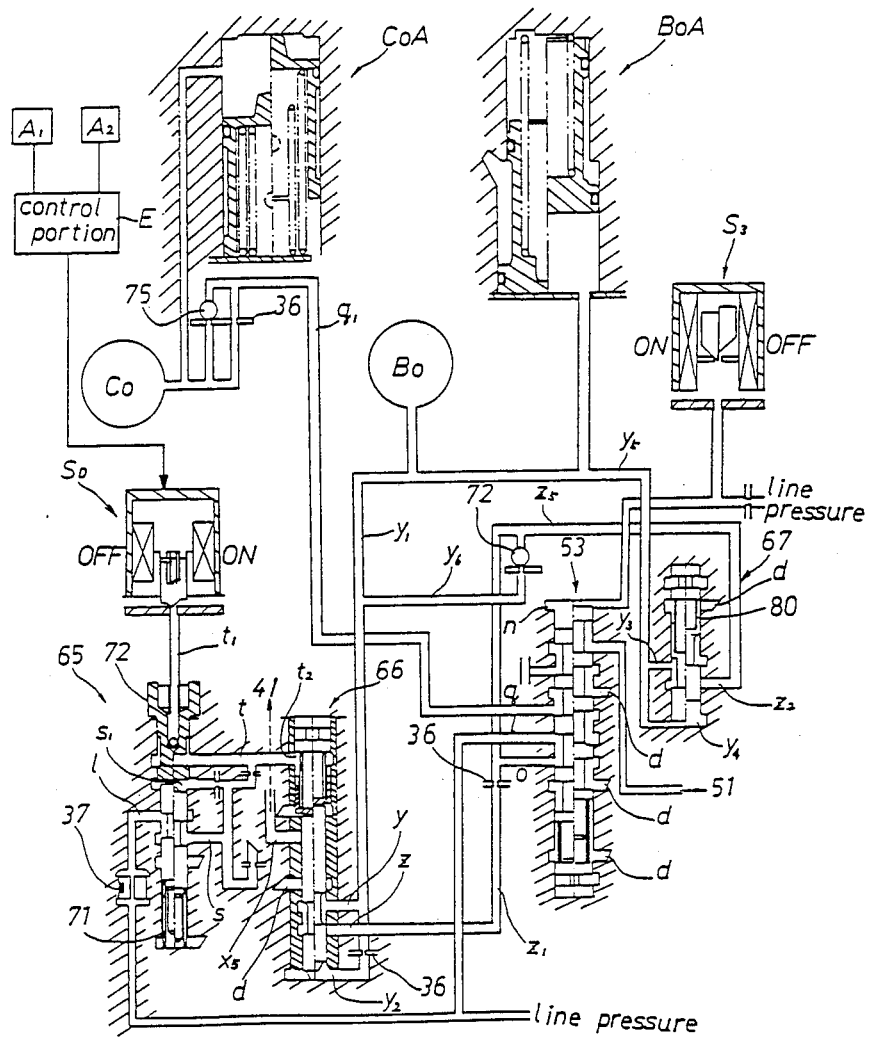
FIG. 6 is an illustration of an essential portion of the hydraulic pressure control mechanism.

As shown in detail in FIG. 6, the $S_D$ modulator valve 65 receives the line pressure from the line pressure port l via the oil filter 37. The line pressure is further fed to the upper end oil chamber $s_1$ through an oil passage s, so as to serve as a feedback pressure. This feedback pressure produces a downward force which acts counter to the upward force of a spring 71, thereby producing a predetermined pressure of, for example, 4 kg/cm$^2$. The thus regulated solenoid modulator pressure is supplied to the oil passage t. In addition, the oil pressure t communicates with the solenoid valve $S_D$ through a plug 72 and an oil passage $t_1$ and also with a Bo release control valve 66. The control pressure produced by the on-off control or duty-ratio control of the solenoid valve $S_D$ is supplied to the oil chamber $t_2$, thereby controlling the control valve 66. The solenoid valve $S_D$ is controlled by a signal which is formed by a control portion E in accordance with the output from the rotation sensors $A_1$, $A_2$.

When the solenoid valve $S_D$ is adapted for on-off control, the throttle pressure is supplied to the oil passage $x_5$, thereby setting a brake release pressure corresponding to the change in the load. The port y of the Bo release control valve 66 is held in communication with the O/D brake Bo and the Bo accummulator BoA through an oil passage $y_1$, and also with a lower end oil chamber $y_2$ through an orifice 36. The oil pressure introduced into the lower end oil chamber $y_2$ serves as a feedback pressure. The oil passage $y_1$ leading from the brake Bo and the Bo accummulator BoA leads to a port $y_3$ of the sequence valve 67, through a by-pass passage $y_5$, and further to the lower end oil chamber $y_4$ of the valve 67. The pressure introduced into the lower end oil chamber $y_4$ serves as feedback pressure. The feedback pressure acting in the oil chamber $y_4$ produces a force which balances the force of a spring 80 on the upper side. The spring 80 is adjusted so that is produces a force corresponding to the initial piston operation pressure at which the brake disks of the O/D brake Bo commence to contact with each other. Thus, the sequence valve 67 assumes the position shown at the left half in FIG. 6, until the pressure is increased to the initial piston operation pressure, so that the hydraulic pressure is supplied to the O/D brake Bo through the port $z_2$ and the port $y_3$. However, when the initial piston operation pressure is exceeded, the sequence valve 67 is switched to the position shown at the right half part in FIG. 6, so that the ports $z_2$ and $y_3$ are blocked. The port z of the control valve 66 communicates with the port o of the third shift valve 53 through the oil passage $z_1$ and the orifice 36. The port o in turn communicates with a port $z_2$ of the sequence valve 67, through a by-pass passage $z_5$. On the other hand, an oil passage $y_6$ branching from the oil passage $y_1$ communicates with the by-pass passage $z_5$ through a check valve 72. On the other hand, the third shift valve 53 has an upper chamber n which communicates with the solenoid valve $S_3$, while its port l communicates with the line pressure passage. The third shift valve 53 further has a port q which communicates with the O/D-direct clutch Co and the Co accummulator CoA through an oil passage $q_1$ and an orifice 36. A check valve 75, which permits the discharge of the oil from the clutch Co, is connected in parallel to the orifice 36 in the oil passage $g_1$. A symbol d represents a drain port.

On the other hand, the lock-up control valve 69 has a function for allowing the torque converter to be locked-up even when the main transmission unit 21 selects the 1st speed, provided that the sub-transmission unit 21 is in the overdrive mode O/D, as well as the known function for locking up the torque converter when the main transmission unit 21 selects the 2nd or a higher speed. Thus, the lock-up control valve 69 permits the lock-up of the torque converter whenever the automatic transmission as a whole selects second or a higher speed.

The second accummulator control valve 70 is provided for the following purpose. When the main transmission unit 21 is upshifted while the sub-transmission unit 16 selects the O/D speed, the capacities of the brakes in the main transmission unit are excessive as compared with the case where the sub-transmission unit is in the direct coupling mode. In such a case, therefore, the second accummulator control valve 70 lowers the pressure supplied to the back pressure chambers 59, 60 and 61 of the accummulators BoA, $C_2A$ and $B_2A$, thereby optimizing the brake capacities.

As shown in FIGS. 1 and 4, the spool 81 of the cut-back valve 43 is urged upwardly by a spring 82. The cut-back valve further has the upper chamber $q_2$ on the upper side of the spool 81 and a lower chamber G on the lower side of the spool 81. The spring 82 mentioned above is compressed in the lower chamber G. The upper chamber $q_2$ communicates through the oil passage $q_3$ with the oil passage $q_1$ leading to the O/D direct clutch Co, while the lower chamber G communicates with a port $G_1$ of the first shift valve 51 through an oil passage $G_2$. The port $G_1$ also communicates with the brake $B_2$ and the $B_2$ accummulator $B_2A$ through an oil passage $G_3$. The cut-back valve 43 also has the port x which receives the throttle pressure from the throttle valve 41 which is supplied as the cut-back pressure to the ports $p_1$ and $p_2$ of the throttle valve 41, through the port p which is selectively opened and closed in accordance with the state of the valve 43.

In another embodiment, as shown in FIGS. 2 and 5, the cut-back valve 43' has a spool 81' which is urged downwardly by a spring 82'. In addition, a lower oil chamber G' is disposed adjacent the lower side of the spool 81'. The lower chamber G' communicates with a change-over valve 83 which permits the supply of the oil pressure from either one of ports $G_4$ and $G_5$. The port $G_5$ of the change-over valve 83 communicates with the port $G_1$ of the first shift valve 51 through the oil passage $G_2$. The port $G_1$ in turn communicates through the oil passage $G_6$ with the brake $B_2$ and the $B_2$ accummulator $B_2A$. On the other hand, the other port $G_4$ of the change-over valve 83 communicates through the oil passage $G_3$ with the oil passage $z_1$ leading from the port o of the third shift valve 53.

The throttle valve 41 has a downshift plug 42 which is operated by a throttle cam 44 operatively connected to the accelerator pedal. The throttle valve 41 further has a throttle spool 79 which opposes the downshift plug 42 across a spring 76. The throttle spool 79 is urged upwardly by a lower spring 77. The arrangement is such that the spool 79 is moved downwardly by the force transmitted through the spring 76 in accordance with the rotation of the throttle cam 44, whereby a pressure corresponding to the throttle opening is supplied from the line port l to the throttle port $x_3$. Furthermore, the throttle pressure is transmitted to the port $x_4$, while the cut-back pressure is supplied to the port $p_1$. These pressures produce an axial force corresponding to the difference in the diameter of the lands on the spool 79. The force acts to drive the spool 79 backward against the force of the spring 76. When the spool 79 has been moved to a position where a balance is obtained between the forces produced by the springs 76 and 77, the line port l is throttled so that the throttle pressure is established at a level corresponding to the vehicle running speed. The downshift plug 42 has lands 42a, 42b and 42c. The area of the land 42a is greater than that of the land 42b which in turn is greater than that of the land 42c. The oil pressure from the port $x_2$ acts over the lands 42a, 42b, while the cut-back pressure introduced through the port $p_2$ acts over the lands 42b, 42c. These pressures produce an axial force which oppose the force exerted by the springs 76, 77 by which the downshift plug 42 is pressed onto the cam 44.

The port $a_1$ of the cut-back valve 43 communicates with the port a of the manual valve 40. A port u which is open to a port $a_1$ when the valve 43 is at the cut-back position communicates with the lock-up control valve 69. An oil passage $a_3$ leading from the port a communicates with the forward clutch $C_1$ and the port $a_2$ of the first shift valve 51. The port $F_2$ of the first shift valve 51 communicates with the port $F_1$ of the third shift valve 53, whereas the ports H,I,J and K of the valve 51 communicate, respectively, with the first coast modulator valve 55, 1st & Rev. brake $B_3$, second coast modulator valve 56, and the second shift valve 52.

The operation of the embodiment explained hereinbefore is as follows.

Table in FIG. 7 shows the states of various operational elements of the multi-speed automatic transmission 1 such as the solenoid valves $S_1$, $S_2$, $S_3$, $S_L$, $S_D$, clutches Co, $C_1$, $C_2$, brakes Bo, $B_1$, $B_2$, $B_3$ and one-way clutches (OWC) Fo, $F_1$, $F_2$, in respective ranges P,R and N and at respective speeds in ranges D, S and L.

When the automatic transmission selects the first speed in D or S range, the O/D direct clutch Co, one-way clutches Fo, $F_2$ and the forward clutch $C_1$ are held in engaged states, while other elements are disengaged, as shown in FIG. 8. In the sub-transmission unit 16, therefore, the planetary gear unit 17 rotates as a unit because the clutch $C_1$ and the one-way clutch Fo are engaged, so that the rotation of the input shaft 15 is directly transmitted to the input shaft 26 of the main transmission unit 21. The rotation of the input shaft 26 is transmitted through the clutch $C_1$ to the ring gear 33 of the front planetary gear unit 19 and is further transmitted to the carrier 28 and the output shaft 27 which is integral with the carrier 28. At the same time, this rotation tends to cause a counter-clockwise rotation of the carrier 34 of the rear planetary gear unit 20 through the sun gear 30. However, the counter-clockwise rotation of the carrier 34 is prevented by the one-way clutch $F_2$ so that the planet gears 31 rotate about their axes, thereby transmitting the rotation to the ring gear 32 which is integral with the output shaft 27. Thus, the main transmission unit selects the 1st speed gear, while the sub-transmission unit 16 is in the direct coupling state, whereby the transmission as a whole selects a first speed. In this state, a part of the power is transmitted to the output shaft 27 through the front planetary gear unit 19, while the remainder of the power is transmitted through the rear planetary gear unit 20. That is, the load is shared by both planetary gear units.

When first speed is selected, the solenoid of the solenoid valve $S_3$ is not energized, so that the third shift valve 53 assumes the position shown at the right half part of the Figure, so that the line pressure of the line port l is supplied to the O/D clutch Co and the Co accumulator CoA through the port q and the oil passage $q_1$, the port o is drained so that the oil pressure in the overdrive brake Bo is relieved through the ports y and z of the release control valve 66 which is in the position shown at the left half part in the Figure. On the other hand, the solenoid of the solenoid valve $S_1$ is also not energized, so that the first shift valve 51 assumes the position shown at the right half part in the Figure. Therefore, the line pressure supplied from the line port l through the port a in the manual valve 40 is supplied to the forward clutch $C_1$ but the port $a_2$ is blocked in the first shift valve 51 so that the oil pressure is not supplied to the second brake $B_2$.

In this state, in the embodiment shown in FIG. 1, the upper chamber $q_2$ of the cut-back valve 43 is supplied with the pressurized oil through the oil passage $q_3$ as a result of the supply of the hydraulic pressure to the O/D clutch Co, while the lower chamber G thereof is drained as a result of the draining of oil from the brake $B_2$. Therefore, due to the hydraulic pressure of the upper chamber $q_2$, the spool 81 in the cut-back valve 43 is moved to the position shown at the right half part in the Figure against the force of the spring 82, whereby the ports x and p are disconnected from each other, thus preventing the supply of the cut-back pressure to the throttle valve 41.

On the other hand, in the embodiment shown in FIG. 2, both the O/D brake Bo and the 2nd brake $B_2$ are not supplied with the hydraulic pressure, so that no hydraulic pressure acts in the lower chamber G'. Therefore, in the cut-back valve 43', the spool 81' is urged to the lower position shown at the right half part in the Figure by the force of the spring 82. The ports x and p are therefore isolated from each other so as to prevent the supply of the cut-back pressure to the throttle valve 41.

When the second speed is selected in D or S range, the O/D brake Bo, one-way clutch $F_2$ and the forward clutch $C_1$ are engaged, while other elements are disengaged, as shown in FIG. 9. Therefore, in the sub-transmission unit 16, the sun gear 23 is locked by the brake Bo, while the carrier 24 is rotated causing the planet gears 22 to rotate about their axes, thereby transmitting the power to the ring gear 25, whereby the input shaft 26 of the main transmission unit 21 is driven at an increased speed, i.e. the overdrive mode O/D is attained. On the other hand, the main transmission unit 21 still selects the 1st speed gear as in the case where the automatic transmission as a whole selects first speed, so that the transmission as a whole selects second speed by the combined output of the first speed gear selected by the main transmission unit 21 and the overdrive (O/D) state selected by the sub-transmission unit 16.

In this state, the solenoid of the solenoid valve $S_3$ is energized as shown in FIG. 6, so that the line pressure is supplied to the upper chamber n of the third shift valve 53, whereby the third shift valve 53 is switched to the state shown at the left half part in the Figure. As a result, the pressurized oil is drained from the clutch Co and the accummulator CoA to the drain port d through the port q, so that the clutch Co is disengaged and the line pressure port 1 is brought into communication with the port o. When the line pressure from the port o is below the initial piston operation pressure, the line pressure is supplied directly to the O/D brake Bo through the by-pass passage $z_5$, ports $z_2$ and $y_3$ of the sequence valve 67, and the by-pass passage $y_5$. However, when the initial piston operation pressure is exceeded, the sequence valve 67 is switched to the position shown at the right half part, so that the line pressure from the port o is delivered to the port z of the Bo release control valve 66 through the orifice 36 and the oil passage $z_1$. Meanwhile, the control valve 66 is held in the position shown at left half part in the Figure, so that the port z and the port y communicate with each other, whereby the line pressure is supplied to the brake Bo and the Bo accummulator BoA through the oil passage $y_1$, thereby engaging the brake Bo.

In this state, in the embodiment shown in FIG. 1, the oil in the O/D clutch Co is drained, so that the oil in the upper chamber $q_2$ of the cut-back valve 43 is drained when second speed is selected. In addition, the first shift valve 51 is held in the position shown at the right half part in the Figure and no oil pressure is applied to the lower chamber G. Therefore, the spool 81 of the cut-back valve 43 is returned by the force of the spring 82 upwardly to the position shown at the left half part in FIG. 1, whereby the port x and the port p communicate with each other.

On the other hand, in the embodiment shown in FIG. 2, the oil pressure is supplied to the lower chamber G' of the cut-back valve 43' through the oil passage $G_3$ and the port $G_4$ of the change-over valve 83, as a result of the supply of the hydraulic pressure to the O/D brake Bo. Consequently, the spool 81' of the cut-back valve 43' is moved upward against the force of the spring 82' to the position shown in left half part in FIG. 2, thus allowing the ports x and p to communicate with each other. As a result, the throttle pressure from the port x is transmitted to the ports $p_1$ and $p_2$ of the throttle valve 41 through the port p, thereby urging the spool 79 backward against the force of the spring 76, thus allowing the throttle pressure to be established at a low level and reducing the force by which the downshift plug 42 is pressed onto the throttle cam 44.

When the transmission as a whole selects third speed in D range, the O/D clutch Co, one-way clutch Fo, forward clutch $C_1$, one-way clutch $F_1$ and the brake $B_2$ are engaged, while other elements are disengaged, as shown in FIG. 10. Therefore, the sub-transmission unit 16 assumes the direct coupling mode described above, so that the rotation of the input shaft 15 thereof is directly transmitted to the input shaft 26 of the main transmission unit 21. In the main transmission unit 21, the rotation of the input shaft 26 is transmitted to the ring gear 33 of the front gear unit 19 through the clutch $C_1$, tending to cause counter-clockwise rotation of the sun gear 30 through the planet gear 29. However, since the sun gear 30 is locked against counter-clockwise rotation by the one-way clutch $F_1$ due to the engagement of the brake $B_2$, the carrier 28 is rotated while allowing the planet gear 29 to rotate about its axis. Thus, the rotation of the input shaft 26 is transmitted to the output shaft 27 at the 2nd speed only through the front gear unit 19. Consequently, the transmission 1 as a whole operates in third speed which is obtained by the combination of the direct-coupling speed output by the sub-transmission unit 16 and the 2nd speed output by the main transmission unit 21.

In this state, the solenoid of the solenoid valve $S_1$ is energized so that the first shift valve 51 is switched to the state shown at the left half part in FIG. 1 and 2, so that the line pressure available at the port $a_2$ is transmitted to the port $G_1$, and the line pressure is supplied to the brake $B_2$ and the accummulator $B_2A$. The speed changing operation of the main transmission unit 21, i.e. the change in the rotational speed of the sun gear 30, is sensed by the rotary sensor $A_2$, so that the duty-ratio control or on-off control of the solenoid valve $S_D$ is effected by the electric signal coming from the control portion E, thereby reducing the modulator pressure in the oil passage t. Namely, the $S_D$ modulator valve 65 receives the line pressure through the line port 1 and regulates this pressure by the force of the spring 71 and the force produced by the pressure fed back to the upper chamber $s_1$, thus producing a regulated pressure which is delivered to the oil passage t. This modulator pressure is reduced as a result of the control effected by the solenoid valve $S_D$ so that the pressure is reduced also in the upper chamber $t_2$ of the release control valve 66 which communicates with the oil passage t. Therefore, the control valve 66 is switched to the position shown at the right half part in FIG. 6 by the pressure which is fed back to the lower chamber $y_2$ from the brake Bo, so that the oil from the brake Bo and the accummulator Bo is drained from the drain port d via the oil passage $y_1$ and the port y. At this moment, the rotation sensor $A_2$ detects the completion of the speed changing operation of the main transmission unit 21, i.e. the stopping of the rotation of the sun gear 30. In response to the output from the rotation sensor $A_2$, the control portion E produces an electric signal to de-energize the solenoid of the solenoid valve $S_3$, thereby switching the third shift valve 53 to the position shown at the right half part in FIG. 1. As a result, the line pressure port 1 communicates with the port q so that the line pressure is supplied to the clutch Co and the Co accummulator CoA through the oil passage $q_1$, thereby engaging the clutch Co. At the same time, the port o is brought into communication with the drain port d, so that the oil in the O/D brake Bo is drained completely and quickly from the drain port d via the oil passage $y_6$, check valve 72, oil passage $z_5$ and the port o, thereby the speed changing operation in the sub-transmission unit 16 is completed. The timing of the operation for releasing the O/D brake Bo, therefore, coincides with that of the operation for engaging the brake $B_2$.

When the third speed is selected by the transmission 1, in the embodiment shown in FIG. 1, the hydraulic pressure is supplied to the O/D clutch Co and also to the upper chamber $q_2$ of the cut-back valve 43. At the same time, the hydraulic pressure is also supplied to the lower chamber G through the oil passage $G_2$ as a result of the supply of the hydraulic pressure to the brake $B_2$. However, the upward force which is the sum of the force of the spring 82 and the force produced by the pressure acting in the lower chamber G exceeds the downward force produced by the pressure acting in the upper chamber $q_2$, and the spool 81 is held in the raised position shown at left half part in FIG. 1. In this state, the cut-back pressure is supplied to the throttle valve 41, as in the case where second speed is selected.

On the other hand, in the embodiment shown in FIG. 2, the change-over valve 83 is switched to block the port $G_4$ while opening the port $G_5$, as a result of the draining of the hydraulic pressure from the overdrive brake Bo and the supply of the hydraulic pressure to the brake $B_2$. Consequently, the spool 81' of the cut-back valve 43' is held at the raised position shown at the left half part in FIG. 2 as a result of the application of the hydraulic pressure to the lower chamber G' through the oil passage $G_2$ and the port $G_5$ of the change-over valve 83, and in response to the supply of the hydraulic pressure to the brake $B_2$. In this state, the cut-back pressure is supplied to the throttle valve 41, as in the case where second speed is selected.

Figure 11:
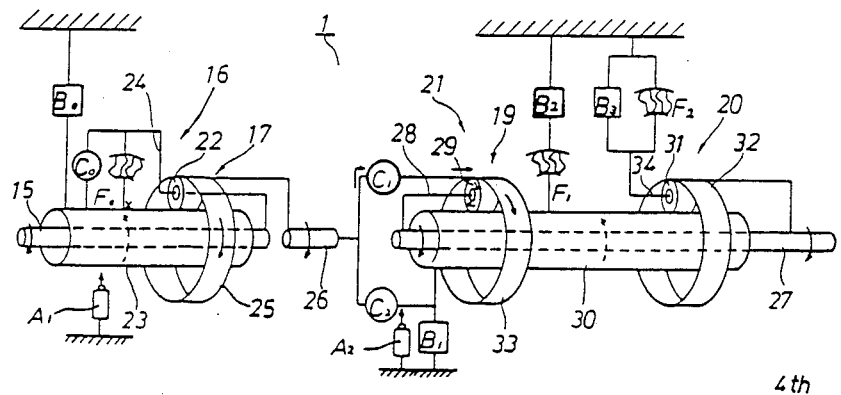

When the transmission 1 as a whole selects fourth speed in D range, the O/D brake Bo, forward clutch $C_1$, brake $B_2$ and the one-way clutch $F_1$ are engaged, while other elements are disengaged, as will be seen from FIG. 11. Therefore, the sub-transmission unit 16 is in the overdrive (O/D) mode, while the main transmission unit 21 selects the second speed gear, thus attaining fourth speed in the automatic transmission 1 as a whole.

In the embodiment shown in FIG. 1, when the fourth speed is selected, the upper chamber $q_2$ of the cut-back valve 43 is drained as a result of the release of the O/D clutch Co. On the other hand, since the first shift valve 51 is held in the position shown at the left half part in FIG. 1, the line pressure from the port a is delivered to the lower chamber G, so that the cut-back valve 43 assumes the cut-back pressure supply position where the ports x and p communicates with each other.

In the embodiment shown in FIG. 2, the hydraulic pressure is also supplied to the port $G_4$ of the change-over valve 83 as a result of the application of the hydraulic pressure to the overdrive brake Bo. However, since the first shift valve 51 is held in the position shown at the left half part in FIG. 1, the line pressure from the port $a_2$ is continuously supplied to the port $G_5$ so that the change-over valve 83 is not switched. Consequently, the application of hydraulic pressure to the lower oil chamber G' through the port $G_5$ is maintained, so that the cut-back valve 43' assumes the cut-back pressure supply position at which it permits the ports x and p to communicate with each other.

Figure 12:
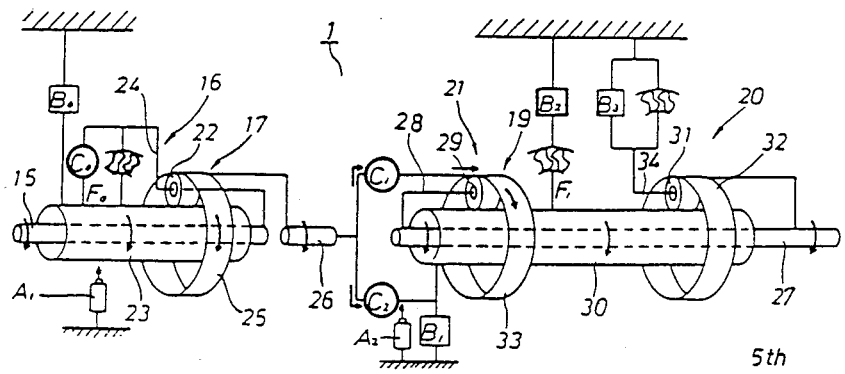

In the fifth speed operation of the automatic transmission in D range, the O/D clutch Co, one-way clutch Fo, forward clutch $C_1$, direct clutch $C_2$ and the brake $B_2$ are engaged, while other elements are disengaged, as shown in FIG. 12. Therefore, the sub-transmission unit 16 is held in the direct-coupling mode as described above. On the other hand, in the main transmission unit 21, since the clutches $C_1$ and $C_2$ are engaged, the front planetary gear unit 19 rotates as a unit, so that the rotation of the input shaft 26 is transmitted directly to the output shaft 27. As a result, the fifth speed is obtained in the automatic transmission 1 as a whole in which the input shaft 15 and the ouput shaft 27 rotate as if they are integral, by the combination of the direct-coupling state of the sub-transmission unit 16 and the 3rd speed of the main transmission unit 21.

In the embodiment shown in FIG. 1, the solenoid $S_1$ is kept energized even in this fifth speed operation of the automatic transmission 1 so that the first shift valve 51 remains in the position shown at the left half part in the Figure. In addition, the supply of oil pressure to the lower chamber $j_2$ of the cut-back valve 43 is still maintained. Therefore, the cut-back valve 43 is held in the cut-back pressure supply position shown at the left half part in the Figure even if the hydraulic pressure is supplied to the upper chamber $q_2$ when the O/D clutch Co is engaged.

In the embodiment shown in FIG. 2 also, the supply of the hydraulic pressure to the lower oil chamber G' is maintained through the port $G_5$ of the change-over valve 83 so that the cut-back valve 43' remains in the cut-back pressure supply position shown at the left half part in the Figure.

Figure 13:
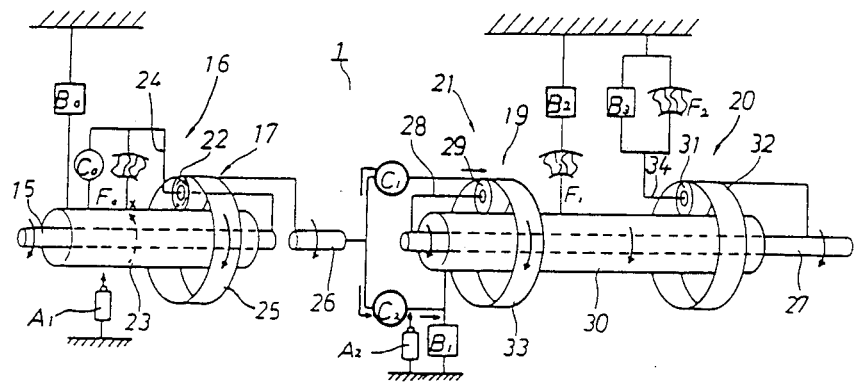

When the automatic transmission 1 selects the sixth speed in D range, the O/D brake Bo, forward clutch $C_1$, direct clutch $C_2$ and the brake $B_2$ are engaged, while other elements are disengaged, as shown in FIG. 13. Therefore, the sub-transmission unit 16 is in the overdrive (O/D) mode described above, while the main transmission unit 21 selects the 3rd speed gear mentioned above before. Therefore, the automatic transmission as a whole attains sixth speed by combination of the overdrive mode of the sub-transmission and the 3rd speed of the main transmission unit 21. The first shift valve 51 assumes the position shown at the left half part in the Figure also when sixth speed is selected, and the cut-back valve 43 or 43' is held in the cut-back pressure supply position by the hydraulic pressure which acts in the lower chamber G or G', in each of the embodiments shown in FIGS. 1 and 2.

Figure 14:
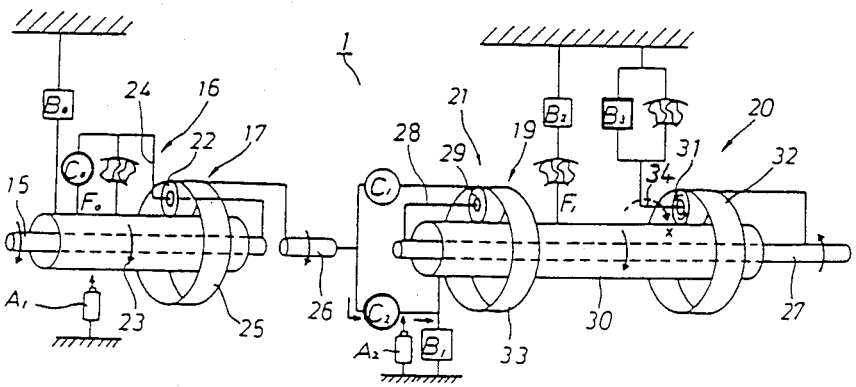

When the manual valve is positioned to select R range, the O/D clutch Co, one-way clutch Fo, direct clutch $C_2$ and the brake $B_3$ are engaged, while other elements are disengaged, as will be seen from FIG. 14. Therefore, the sub transmission unit 16 is in the direct-coupling mode, whereas, in the main transmission unit 21, the rotation of the input shaft 26 is directly transmitted to the sun gear 30 through the clutch $C_2$. In addition, since the carrier 34 of the rear planetary gear unit 20 is locked against rotation by the brake $B_3$, the rotation of the sun gear 30 is transmitted to the ring gear 32 through the planet gears 31 which rotate about their own axes so as to reverse the direction of rotation, whereby the output shaft 27 is rotated in the direction counter to the direction of rotation of the input shaft 15, thus attaining the reversing mode of the automatic transmission.

In this reversing mode, in the embodiment shown in FIG. 1, the port a is not supplied with the line pressure any more because the manual valve 40 has been switched to R range. At the same time, the first shift valve 51 is switched to the right half position in Figure because the solenoid valve $S_1$ is not energized. Consequently, the oil in the brake $B_2$, as well as the oil in the lower chamber G of the cut-back valve 43, is drained. On the other hand, the solenoid of the third solenoid valve $S_3$ is not energized while the third shift valve 53 is in the position shown at right half part in the Figure. Therefore, the pressure existing in the line pressure port 1 is supplied to the O/D clutch Co through the port q and also to the upper chamber $q_2$ of the cut-back valve 43. Therefore, the cut-back valve 43 is held in the state shown at the right half part in FIG. 1, as in the case where first speed is selected. Therefore, the throttle pressure at the port x is interrupted, and the cut-back pressure in the ports p, $p_1$ and $p_2$ is drained.

On the other hand, in the embodiment shown in FIG. 2, the hydraulic pressure is not applied to the lower chamber G' of the cut-back valve 43' due to draining of hydraulic pressure from the overdrive brake Bo, as in the case where first speed is selected. Consequently, the spool is urged to the lower position shown at the right half part in FIG. 2, by the force of the spring 82. As a result, the throttle pressure of the port x is interrupted and the cut-back pressure in the ports p, $p_1$ and $p_2$ is drained. The cut-back valve 43 or 43' is also held in the cut-back pressure supply position when the automatic transmission also selects P or N range, as in the case of the R range, because the manual valve 40 is switched to positions where it does not permit the supply of the line pressure through the port a.

When the third or fourth speed is selected in S or L range, the operation is similar to that explained above in connection with the third and fourth speed operation in D range (see FIGS. 10 and 11). In S or L range, however, the coast brake $B_1$ is engaged, so that the sun gear 30 is prevented from rotating in both directions, thus enabling an engine brake to be effected. When upshifting from second speed to third speed, the solenoid valve $S_D$ is controlled so that the sub-transmission unit 16 and the main transmission unit 21 are shifted simultaneously as in the case of the D range.

When first or second speed is selected in L range, the operation is similar to that with the first or second speed in D range (see FIGS. 8 and 9). In this case, however, the brake $B_3$ is engaged so that the carrier 34 of the rear planetary gear unit 20 is prevented from rotating in both directions, whereby engine braking is effected. In upshifting from third to fourth speed and from first to second speed in S or L range, the operation of the cut-back valve 43, 43' is the same as that performed when upshifting in D range.

Although embodiments have been described with reference to a longitudinal automatic transmission for rear-wheel drive vehicles having the sub-transmission unit 16 on the front side and the main transmission unit 21 on the rear side, this is not exclusive and the invention can equally be applied to a transverse type automatic transmission for front-wheel drive vehicles in which the main transmission unit is disposed on the front side while the sub-transmission of underdrive planetary unit is disposed on the rear side.

The described embodiments of the invention offer the following advantages.

It is to be noted first that the described embodiments enable the supply of adequate cut-back pressure by a slight modification of the known hydraulic control device, without requiring a substantial change in the design. Namely, the advantageous effect is achieved merely by forming an oil chamber $q_2$ in the cut-back valve 43 on the side opposite to the oil chamber G which is supplied with the hydraulic pressure when the main transmission unit 21 selects 2nd or a higher speed, in such a manner that the chamber $q_2$ receives the hydraulic pressure when the sub-transmission unit 16 is in the low-speed mode or, alternatively, by providing a change-over valve 83 which is adapted to supply the hydraulic pressure to the chamber G' of the cut-back valve 43' when the sub-transmission unit 16 is in the higher-speed mode, even though the main transmission unit selects the first speed.

In addition, the invention can be carried out by making use of the known overdrive automatic transmission. Namely, the invention can be achieved by using an overdrive planetary gear unit 17 as the sub-transmission unit 16, while employing a combination of a front planetary gear unit 19 and a rear planetary gear unit 20 as the main transmission unit 21, with one of the chambers $q_3$ in the cut-back valve 43 communicating with the direct clutch Co of the overdrive planetary gear unit 17 while the other chamber G communicates with the brake $B_2$ for preventing rotation in one direction of the sun gear 30 of the front and rear planetary gear units 19,20, or, alternatively, with a chamber G' of the cut-back valve 43' communicating with the brake Bo of the overdrive planetary gear unit 17 and with the brake $B_2$ the sun gear 30, of the front and rear planetary gear units 19, 20, from rotating in one direction. Thus, the production system for the production of the known automatic transmission can be used without substantial changes, thus enabling the production of the multi-speed automatic transmission 1 at a low cost.

Although the invention has been described through specific terms, it is to be noted here that the described embodiments are only illustrative, and various changes and modifications are possible without departing from the scope of the invention which is limited solely by the appended claims.

What is claimed is:

1. A cut-back pressure control device for an automatic transmission, comprising:
   a sub-transmission unit through which power is transmitted in a respective one of power transmitting paths defined therethrough, the sub-transmission unit shiftable between a high-speed mode at which power is transmitted through one of said paths and a low-speed mode at which power is transmitted through another of said paths;
   a main transmission unit through which power is transmitted in one of at least two power transmitting paths, the main transmission unit shiftable between at least two shifting stages at which power is transmitted through respective ones of said at least two power transmitting paths,
   said main transmission unit operatively connected in series to said sub-transmission unit with engine torque being input to only one of the transmission units for driving said one of the transmission units and only the output of said one of the transmission units being input to the other of the transmission units for driving the other of the transmission units so that the effective output of the main transmission unit is combined with the effective output of the sub-transmission unit to provide a plurality of successively higher speeds that are capable of being output by the transmission;
   frictional engagement elements for selecting the power transmitting paths through which power is transmitted in the sub-transmission unit and the main transmission unit;
   hydraulic servomotors for actuating said frictional engagement elements;
   a thorttle valve for establishing throttle pressure,
   a cut-back valve operatively hydraulically connected to said throttle valve for applying cut-back pressure to said throttle valve to regulate the throttle pressure;
   said hydraulic servomotors including a first hydraulic servomotor disposed in said sub-transmission unit and operatively hydraulically connected to said cut-back valve, said first hydraulic servomotor for operating one of the frictional engaging elements with hydraulic pressure that varies when the sub-transmission unit is shifted between the high-speed mode and the low-speed mode, and a second hydraulic servomotor disposed in said main transmission unit and operatively hydraulically connected to said cut-back valve, said second hydraulic servomotor for operating another of the frictional engaging elements with hydraulic pressure when the main transmission unit is shifted to the second of said at least two shifting stages and any of higher ones of said at least two shifting stages at which the main transmission unit outputs a speed that is higher than that output by the main transmission unit when shifted to the first of said at least two shifting stages; and said cut-back valve having a spool for moving between a first position at which the cut-back valve does not apply said cut-back pressure to the throttle valve in response to the hydraulic pressure transmitted from said first hydraulic servomotor when said main transmission unit is shifted to the first shifting stage and the sub-transmission unit is shifted to said low-speed mode and a second position at which the cut-back valve applies said cut-back pressure to the throttle valve when said sub-transmission unit is shifted to said high-speed mode or when said main transmission unit is shifted to the second or the higher ones of said shifting stages.

2. A cut-back pressure control device for a multi-speed automatic transmission as claimed in claim 1, wherein said cut-back valve comprises respective chambers each of which is open to an end of the spool and biasing means for urging the spool toward one of the chambers, said one of the chambers operatively hydraulically connected to said first hydraulic servomotor and the other of said chambers operatively hydraulically connected to said second hydraulic servomotor.

3. A cut-back pressure control device for a multi-speed automatic transmission as claimed in claim 2, wherein said sub-transmission unit comprises an overdrive planetary gear unit, said main transmission unit comprises a front planetary gear unit and a rear planetary gear unit, the frictional engagement element operated by said first hydraulic servomotor is a clutch operatively connected to the overdrive plantary gear unit, and the frictional engagement element operated by said second hydraulic servomotor is a brake for selectively locking an outer race of a one-way clutch which is operative to the prevent the sun gear of the front and the rear planetary gear units from rotating in one direction.

4. A cut-back pressure unit control device for an automatic transmission, comprising:

a sub-transmission unit through which power is transmitted in a respective one of power transmitting paths defined therethrough, the sub-transmission unit shiftable between a high-speed mode at which power is transmitted through one of said paths and a low-speed mode at which power is transmitted through another of said paths;

a main transmission unit through which power is transmitted in one of at least two power transmitting paths, the main transmission unit shiftable between at least two shifting stages at which power is transmitted through respective ones of said at least two power transmitting paths, said main transmission unit operatively connected in series to said sub-transmission unit with engine torque being input to only one of the transmission units for driving said one of the transmission units and only the output of said one of the transmission units being input to the other of the transmission units for driving the other of the transmission units so that the effective output of the main transmission unit is combined with the effective output of the sub-transmission unit to provide a plurality of successively higher speeds that are capable of being output by the transmission;

frictional engagement elements for selecting the power transmitting paths through which power is transmitted in the sub-transmission unit and the main transmission unit;

hydraulic servomotors for actuating said frictional engagement elements;

a throttle valve for establishing throttle pressure for controlling said frictional engagement elements;

a cut-back valve operatively hydraulically connected to said throttle valve for applying cut-back pressure to said throttle valve to regulate the throttle pressure, said cut-back valve having a spool, a chamber open to an end of the spool and biasing means for urging said spool in a direction toward said chamber; and a changeover valve operatively hydraulically connected to said chamber and to said first and said second hydraulic servomotors for selectively placing said chamber in open hydraulic communication with one of said first and said second servomotors, the frictional engaging element actuated by a first one of said hydraulic servomotors being operated with hydraulic pressure supplied to the first servomotor when the sub-transmission unit is shifted to said high-speed mode, and the frictional engaging element actuated by a second one of said hydraulic servomotors being operated with hydraulic pressure supplied to the second servomotor when the main transmission unit is shifted to the second of said at least two shifting stages and any of higher ones of said at least two shifting stages at which the main transmission unit outputs a speed that is higher than that output by the main transmission unit when shifted to the first of said at least two shifting stages.

5. A cut-back pressure control device for a multi-speed transmission as claimed in claim 4, wherein said sub-transmission unit is an overdrive planetary gear unit, said main transmission unit comprises a front planetary gear unit and a rear planetary gear unit, said frictional engaging element actuated by said first servomotor is a brake operatively connected to the overdrive planetary gear unit, and said frictional engaging element actuated by said second servomotor is a brake for locking an outer race of a one way clutch which is operative to prevent the sun gear of the front and the rear planetary gear units from rotating in one direction.

* * * * *